(12) United States Patent
Raheman

(10) Patent No.: US 8,397,279 B2
(45) Date of Patent: Mar. 12, 2013

(54) METHOD AND SYSTEM OF NETWORK INTEGRITY VIA DIGITAL AUTHORIZATION (NIDA) FOR ENHANCED INTERNET SECURITY

(76) Inventor: Fazal Raheman, Dubai (AE)

( * ) Notice: Subject to any disclaimer, the term of this patent is extended or adjusted under 35 U.S.C. 154(b) by 936 days.

(21) Appl. No.: 11/892,186

(22) Filed: Aug. 21, 2007

(65) Prior Publication Data

US 2008/0066163 A1   Mar. 13, 2008

Related U.S. Application Data

(60) Provisional application No. 60/842,676, filed on Sep. 7, 2006.

(51) Int. Cl.
*G06F 15/16* (2006.01)
(52) U.S. Cl. ............... 726/4; 726/22; 713/155; 713/193
(58) Field of Classification Search .................. 726/2, 4, 726/22, 25, 3; 713/155, 193; 709/224
See application file for complete search history.

(56) References Cited

U.S. PATENT DOCUMENTS

| | | | |
|---|---|---|---|
| 7,203,838 B1* | 4/2007 | Glazer et al. ................. | 713/176 |
| 7,341,191 B2* | 3/2008 | Russell et al. ............ | 235/462.01 |
| 2006/0041508 A1* | 2/2006 | Pham et al. ..................... | 705/50 |
| 2009/0043765 A1* | 2/2009 | Pugh ............................... | 707/6 |

* cited by examiner

*Primary Examiner* — Kim Vu
*Assistant Examiner* — Baotran N To

(57) ABSTRACT

A novel method for online authentication of an authorized website is described to prevent the circulation of forged web pages on the World Wide Web. The novel feature of the instant invention is encryption-independent method of securing online transactions by authenticating the server to the client and client to the server. In the instant invention the approach is deployed in curbing the menace of spoofed websites on the World Wide Web by allowing the delivery of only those web pages that are authentic and hosted on an authorized remote server. The method comprises of a graphic representation of the identity of the authorized remote server on the visible portion of the web page served by that remote server. Such graphic representation is capable of being scanned, read and allowed access, only if resolved to the identity of the authorized remote server every time that web page is requested by another authorized computer connected to the Internet.

7 Claims, 5 Drawing Sheets

Flow Diagram for the Preferred Embodiment

N.I.D.A Symbology of a Preferred Embodiment

Flow Diagram for the Preferred Embodiment

METHOD AND SYSTEM OF NETWORK INTEGRITY VIA DIGITAL AUTHORIZATION (NIDA) FOR ENHANCED INTERNET SECURITY

This non-provisional application claims priority filing data through its preceding provisional application bearing number US60/842,676 filed on Sep. 7, 2006 entitled, "Novel Method and System of Network Integrity via Digital Authorization (NIDA) for Enhanced Internet Security."

STATEMENT REGARDING FEDERALLY SPONSORED RESEARCH OR DEVELOPMENT

Not Applicable

REFERENCE TO A MICROFICHE APPENDIX

Not Applicable

TECHNICAL FIELD

An improved encryption-independent method and system of online security that supplements and plugs the security holes that the conventional encryption-based approaches leave open. The present invention relates generally to a novel encryption-independent approach in ensuring network integrity particularly by embedding in a web page a graphic representation of the IP address of the authorized remote server hosting that page.

BACKGROUND OF THE INVENTION

Since the advent of the Internet, private key encryption (e.g. SSL) and public key encryption (e.g. RSA, PGP) algorithms have been mainstay of the online data transfer. While the private key encrypted SSL tunneling is the universally deployed protocol for moving the data securely over the Internet, public key encryption protocols are generally deployed in online user authentication. The recent epidemic of phishing and its continuously evolving variants (such as keylogging, pharming, evil twin, and very recently reported sound snooping) has made all the existing encryption protocols inconsequential. The online fraudsters no more scan the data ports or decrypt an encryption to steel the data, they just steel the user ID and enter the secured network pretending as the authorized user. Hence, whether the website has secured SSL connection to the remote server, or it has a valid certificate from a certification authority has very little relevance to the modus operandi of the modern day fraudsters. The currently available means just cannot stop them. Phishing threats grew from an average of 2.99 million messages a day to 5.70 million between Jan. 1 and Jun. 30, 2005. Ten million victims of ID theft in US Businesses and financial institutions lost $48 billion, while consumer victims reported $5 billion in out-of-pocket expenses. Virtually every major bank has been hit with at least a handful of phishing attempts. Many banks are setting up response teams and codified procedures to deal with the problem. Phishing scams typically employ phony e-mail messages that purport to come from banks or popular Web sites such as eBay or PayPal. The messages try to lure recipients into entering account information and passwords into bogus forms hosted on malicious Web sites. Security experts have recently discovered a malicious program aimed at tricking users into clicking on phony search results on fake Google, Yahoo and MSN sites. People with infected machines who try to visit those popular search sites are redirected to spoof versions. No effective technology is currently available to stop this serious problem. The vastly infinite expanse of the Internet makes it virtually impossible to check authenticity of each and every one of the billions of pages available to the Internet user at the click of a mouse button. The problem is so serious and intractable in public perception that the experts in the industry as well as in academia believe a perfect cure is entirely a fallacy. The invention presented in this disclosure challenges that belief.

The instant invention improvises the operation of World Wide Web by establishing the authenticity of each page delivered to an Internet user. The current certification methods cannot stop spoofed pages from being delivered to an unsuspecting user. The invention not only authenticates the server to the client, but can be used to authenticate authorized client to the server. Therefore, the instant invention describes a novel method of instantly detecting and stopping a fraudulent Web page as soon as it is placed into circulation over the Internet by the fraudster. Accordingly, there is a need for a system described herein to overcome the limitations of the prior art. In the industrial practice the instant invention can be deployed as a novel certification tool. The current certification authorities provide nothing beyond enabling the SSL encryption, which afford absolutely no protection against the new ways that fraudsters steal the personal data.

DESCRIPTION OF THE PRIOR ART

The instant invention deploys a novel virtual bar-coding system. There is large amount of prior art so far as the conventional barcode per se is considered. Unlike the barcode system that is so widely used in the commercial marketplace, the barcode system of the instant invention neither has a physical barcode nor has a physical barcode scanner. Both, the NIDA barcode and the scanner of the instant invention are virtual. There is no precedence of such a system in the prior art.

BRIEF SUMMARY OF THE INVENTION

The Internet has created a marketplace for businesses and consumers to come together and interact in new and exciting ways. Unfortunately, it has also provided criminals and the unscrupulous with a new venue. Nowhere is this more evident than in the recent emergence and growth of the "Phishing" phenomenon. The United States Department of Justice defines phishing as criminals' creation and use of e-mails and websites—designed to look like e-mails and websites of well-known legitimate businesses, financial institutions, and government agencies—in order to deceive Internet users into disclosing their bank and financial account information or other personal data such as usernames and passwords.

It would be an improvement to provide a new method of conducting secure online Internet transactions through a spoof-proof authentic web page. Accordingly it is an object of the invention to provide an encryption-independent method of secure online transaction. The invention overcomes the problems residing in the prior art. It is therefore an object of the invention to provide a spoof-proof method of certification of Websites. It is also an object of the invention to stop and eradicate spoofed websites from circulation on World Wide Web. It is yet another object to guarantee legitimacy of a certified Web page, if the page at all displays on the client terminal. It is also an object of the invention to provide a method of simultaneous authentication of the Website to the client and client to the Website. Accordingly, it is yet another object of the invention to provide password/pin independent method of multi-factor authentication of the authorized client. It is also an object of the instant invention to provide a speedy web page authentication method to a large number of web pages on a server without the limitations of a slow page specific SSL connectivity.

The foregoing discussion summarizes some of the more pertinent objects of the broad encryption-independent digital authorization platform for ensuring network integrity in online transactions. These objects should be construed to be merely illustrative of some of the more prominent features and applications of the invention. Applying or modifying the disclosed invention in a different manner can attain many other beneficial results or modifying the invention as will be described. Accordingly, referring to the following drawings may have a complete understanding of the invention. Description of the preferred embodiment is as follows.

DETAILED DESCRIPTION OF THE INVENTION

Figure 1:
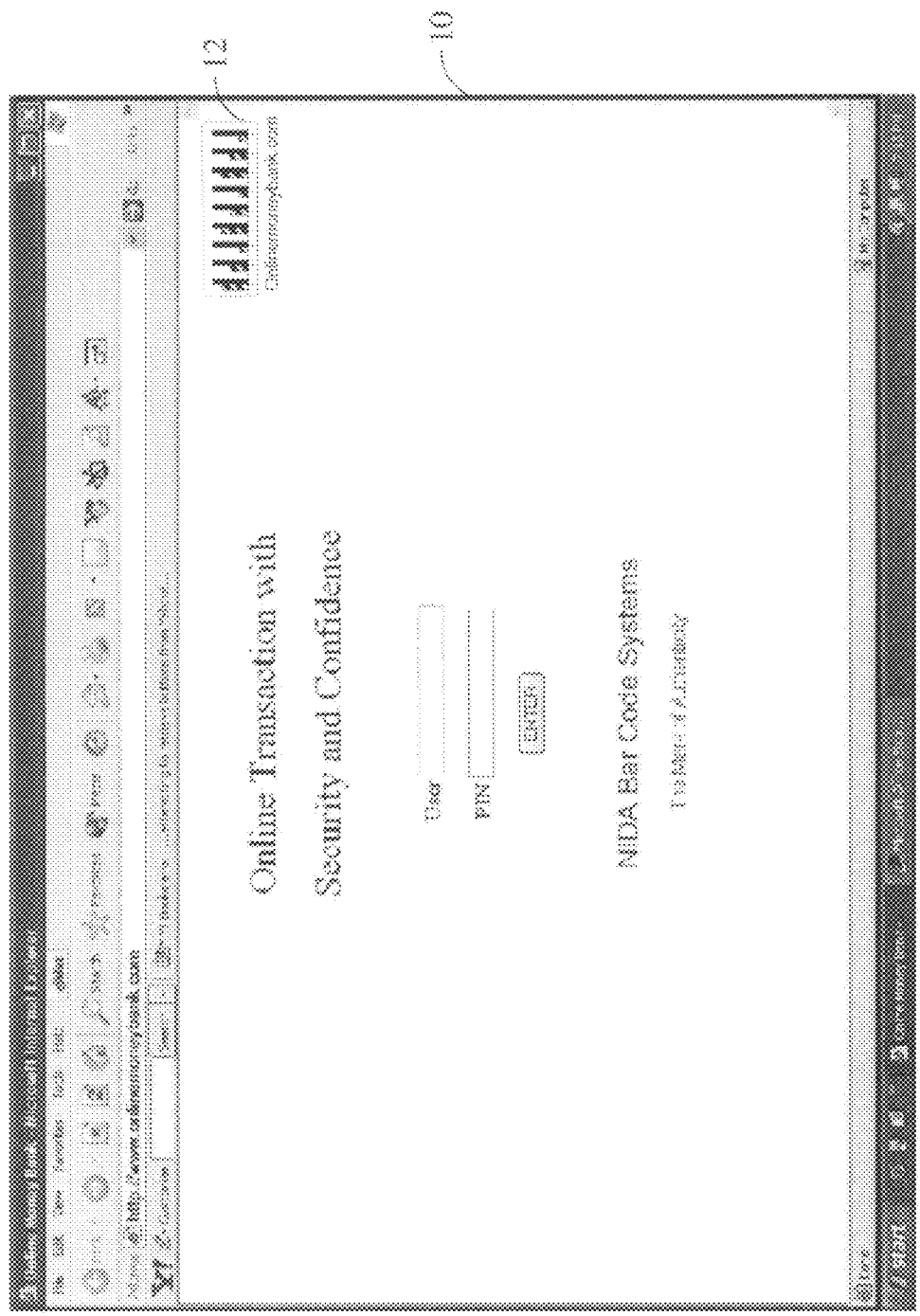
FIG. 1. A Webpage displaying an embodiment of graphic representation of NIDA code.
Figure 2:
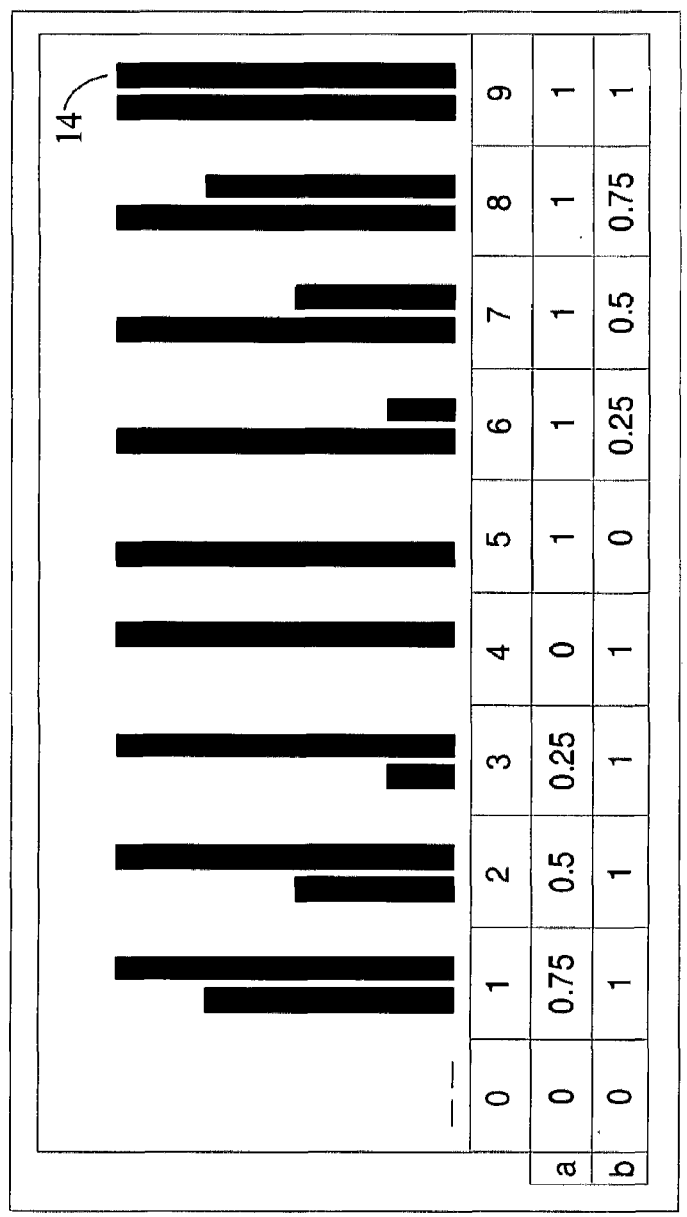
FIG. 2. Graphic representation of graphic symbology used in implementing a preferred embodiment of the invention.
Figure 3:
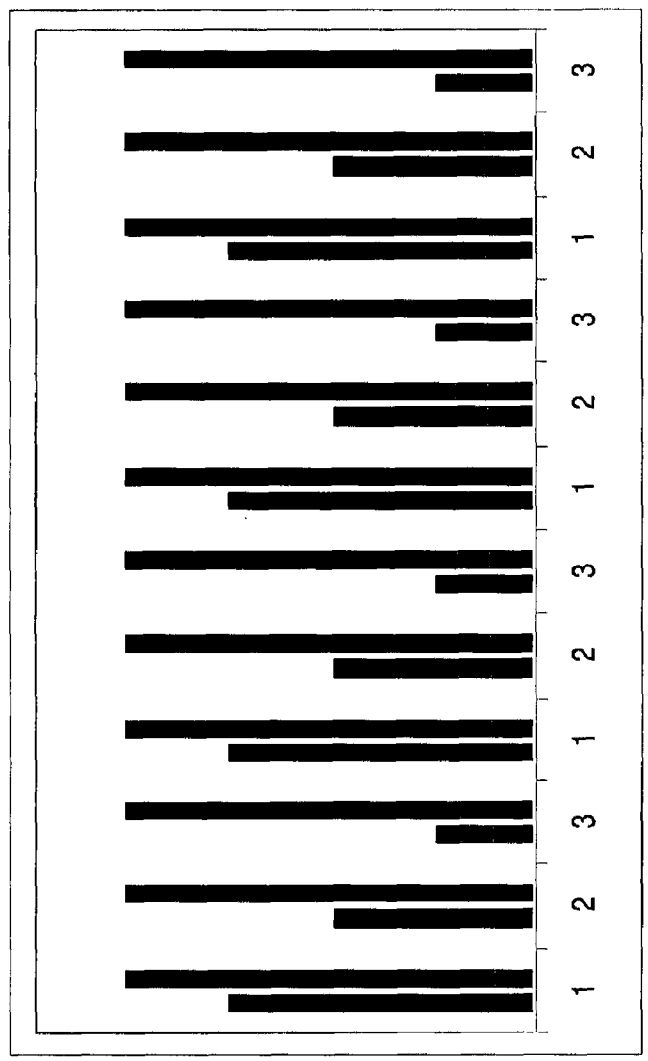
FIG. 3. Graphic representation of a NIDA barcode that resolves to a server IP address of 123.123.123.123
Figure 4:
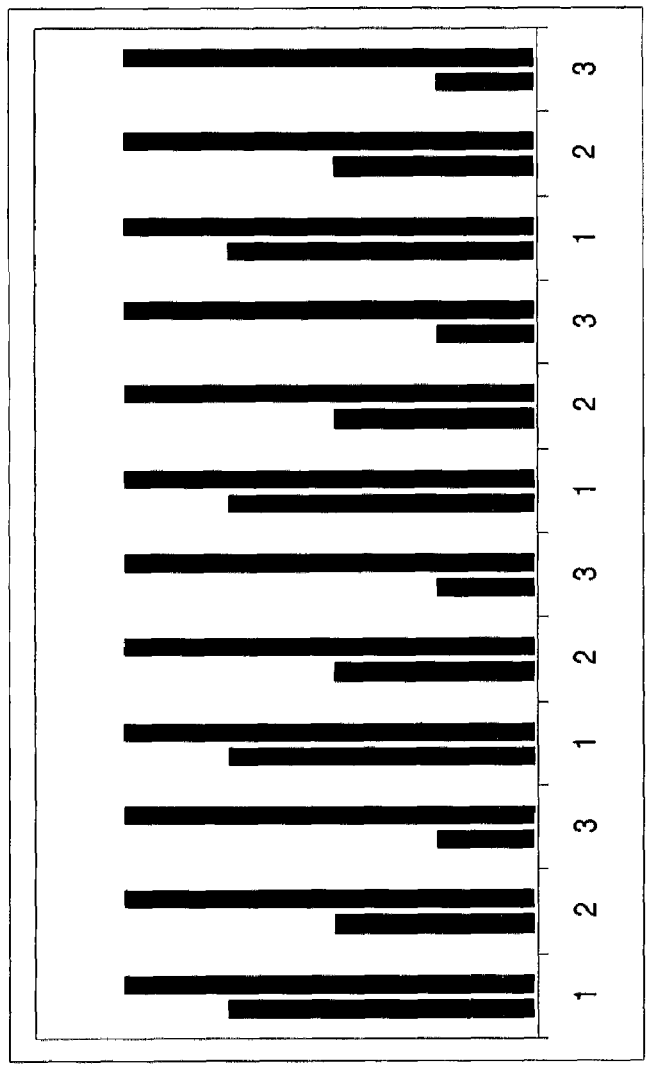
FIG. 4. A forged barcode that resolves to an unauthorized server.

The novel feature of the instant invention is encryption-independent method of securing online transactions by authenticating the server to the client and client to the server. Such novel approach of ensuring network integrity can be deployed in many different ways. In the instant invention the approach is deployed in curbing the menace of spoofed websites on the World Wide Web by allowing the delivery of only those web pages that are authentic hosted on an authorized remote server. There are several possible embodiments of the invention. A few preferred embodiments of the invention are described herein As represented in FIG. 1 one of the preferred embodiments of the present invention is implemented on the Internet through a client-server network of at least three nodes. The NIDA Bar Code System is implemented on the Internet via at least three Nodes. The first is the NIDA Secure Server Node (Node 1), wherein a Web page to be secured 10 is entered into the Network Integrity Digital Authorization System by placing a Bar Code 12 in the right top corner of the Web page, and hosting such Web page on a secured server. See FIG. 1. The Bar Code encodes the IP address of the authorized server that hosts that page. The Bar Code Symbology designed for the preferred embodiment is a two dimensional representation of paired lines/bars 14 of variable lengths. The length and combination of paired lines/bars translate to numbers from 0 through 9. See FIG. 2. Such Bar Code placed on the Web page resolves to a 12 digit authorized IP address of that page. See FIG. 3. The second Node is the NIDA Code Scanner Node. This Node is located at the Client site. When the client requests a Web page from the NIDA Secure Server on his computer terminal, the web page displays the NIDA Bar Code. The Bar Code is scanned by a Bar Code Scanner. In one embodiment the Bar Code Scanner is a software program installed on the client's computer. Such Bar Code may also be a camera equipped cellular phone. In either case the scanned Bar Code image is transmitted to the NIDA Auditor Node, where the web page is verified by decoding the Bar Code to the authorized IP address of the authentic Server The Third Node in the NIDA network is the NIDA Auditor Application located at the ISP, ASP or ISP and ASP. The Auditor is the Software Application, which reads the scanned Bar Code and also the IP address of the server that actually is delivering the page to the user, who requested the page by clicking on a link. If the Bar Code on that Web page and IP address of its server resolve with one of the NIDA authorized servers in the Auditor's database, the page is permitted to be delivered to the User. If it does not, the Web page and its Bar Code is fake, and the Auditor rejects that page and delivers a warning message to the user that the requested link was fraudulent. It also generates a 60 digit Coded Incident Report, which is sent to the Third Node, i.e. the law enforcement terminal or the victim company terminal. The information can be instantly used to track down the fraudster. The novel NIDA Bar Code approach allows the entire verification and page delivery process to complete in milliseconds without any apparent delay to the Internet user.

In the second embodiment the NIDA Code Scanner is a software program located at ISP integrated with the Auditor. In a third preferred embodiment the NIDA Auditor Application operates from the user computer itself. In a fourth embodiment the NIDA Code Scanner is software applet running from another web page requested by the client to scan and check the authenticity of the web page in question. In another preferred embodiment of the NIDA Code may be in the form of any graphical pattern of structured pixels, other than the vertical lines of the Bar Code pattern, such as dots, placed on any visible location of the Web page. In yet another embodiment the NIDA Code is a 24 or 36-digit code representing 12 digit constant code, 12 variable code and 12 digit hyper variable code. The variable and hyper variable codes represent the IP addresses of the ISP and the user computer respectively. In yet another embodiment the Incident Report may be sent by NIDA Auditor as an email message or as an Instant Message to a pre-designated messenger application.

Figure 5:
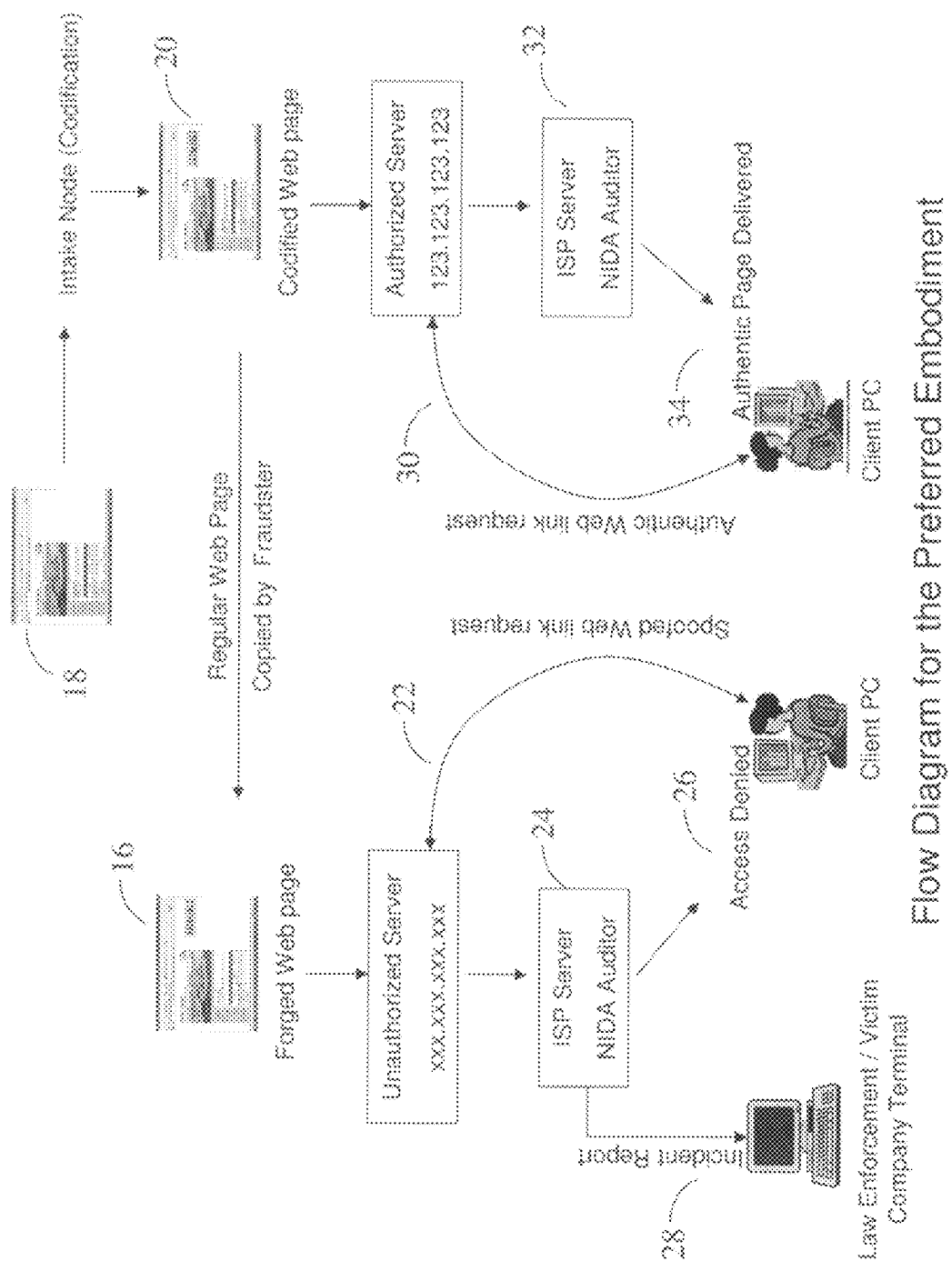
FIG. 5. Block diagram of practical implementation of a preferred embodiment.

The practical implementation of the method begins with a fraudster creating an exact replica 16 of an authentic Web page 18 of a victim company which carries a NIDA Bar Code seal 20. The forged page also includes the graphic likeness of the NIDA Bar Code. See FIG. 5. The fraudster sends the spoofed link to his forged page via email or other web link to the Internet user. When the user clicks on the spoofed link 22, purporting to be an authentic content provider link, the NIDA Auditor decodes the Bar Code, and verifies the actual IP address of the server hosting that page using its database of authorized servers 24. Such audit of the requested page is completed in milliseconds. As the verification fails, NIDA Auditor instead delivers a message to the user that the requested Web page was spoofed, therefore denying the access to that page 26. The NIDA Auditor simultaneously generates an Incident Report and delivers to the Victim Company or the designated law enforcement authority 28. Nevertheless, if the web link request to the desired page is authentic 30, the Bar Code is verified and resolved to the authentic IP address of the authentic web page by the NIDA Auditor 32, and the page is delivered to the client 34. Thus, as described in the preferred embodiment only the authentic web page will be delivered to the client, and a forged page will be detected, stopped and the fraudster located, even before the forged page finds its first victim on the Internet.

The foregoing is the description of some of the preferred embodiments in which the NIDA Bar Code System will not only prevent the fraudulent Web pages from reaching the users, but will be instantly detected and caught by the law enforcement. The invention can also be implemented as other variants of the preferred embodiment. The present invention has been shown in the described embodiments for illustrative purposes only. Furthermore, the terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What I claim as my invention is:

1. A method of encryption-independent secure online transaction on World Wide Web for guaranteeing network integrity via digital authorization (NIDA) of the transaction, implemented on an Internet through a client-server network comprising of the steps of:
   using, on a visible portion of a web page that is served by an authorized remote server, a graphic representation of a two-dimensional bar code symbology of paired lines or bars of variable lengths encoding not more than 36 digit long identification code (NIDA seal) that verifies the identity of the said authorized remote server;
   requesting the web page with NIDA seal from the authorized remote server using an authorized client computer terminal connected to Internet;
   scanning, decoding and auditing NIDA seal of the requested web page using a NIDA Scanner and a NIDA Auditor software to resolve to an authorized Internet Protocol (IP) address of the authorized remote server using database of NIDA Auditor;
   delivering the requested web page to the authorized client computer terminal only if the symbology deployed in the two-dimensional bar coded NIDA seal is decoded and resolved to the IP address of the authorized remote server by NIDA Auditor;
   denying the requested web page access to the authorized client terminal if the web page is not resolved to the authorized remote server's IP address and delivering a message to the client terminal that the requested web page is spoofed;
   delivering to a victim company or a designated law enforcement authority a report of the spoofed web page.

2. The method of claim 1, wherein the two-dimensional bar code of NIDA seal that encodes identity of an authorized remote server is placed on top right corner of an authorized web page encoding not less than 12-digit and not more than 36-digit coded identification of an authorized remote server hosting the web page.

3. The method of claim 1, wherein the graphic representation of the two dimensional bar code symbology deployed in NIDA seal encodes identity of an authorized remote server by means of either,
   a) a pattern of paired lines or bars of variable lengths such that their length and combination translate to numbers from 0 through 9, or,
   b) a graphical pattern of structured pixels other than the vertical lines of a bar code.

4. The method of claim 1, wherein the NIDA seal encodes a dynamic 36-digit numeric identification comprising of a 12 digit constant segment representing IP address of the remote secure server, 12-digit variable segment representing IP address of an Internet Service Provider (ISP) server, and a 12-digit hypervariable segment representing IP address of the authorized client computer, deploying two dimensional symbology comprising of either,
   a) paired lines or bars of variable lengths such that their length and combination translate to numbers from 0 through 9, or,
   b) graphical pattern of structured pixels other than the vertical lines or bars of a bar code.

5. The method of claim 1, wherein NIDA Scanner and NIDA Auditor, deployed for verifying authenticity of a desired web page by an Internet connected authorized client computer, are software programs running either:
   a) on the Internet connected authorized client computer,
   b) on an ISP server, or,
   c) as a platform independent applet program running on another web page especially requested by the Internet connected authorized client computer to check the authenticity of the desired web page.

6. The method of claim 1, wherein NIDA scanner is a camera equipped cellular phone with the ability to take a snap shot of the NIDA seal and transmit it to NIDA auditor for authentication.

7. The method of claim 1, wherein a fraudulent web page is instantly detected and stopped as soon as it is placed into circulation over Internet, and an incident report of failed web page-authentication with description of victim company, victim ISP, victim user and fraudster is instantly delivered to a designated law enforcement authority.

\* \* \* \* \*